No. 697,360.  
A. H. PETTIT.  
FRUIT GRADING MACHINE.  
(Application filed Nov. 27, 1901.)  
Patented Apr. 8, 1902.
(No Model.)
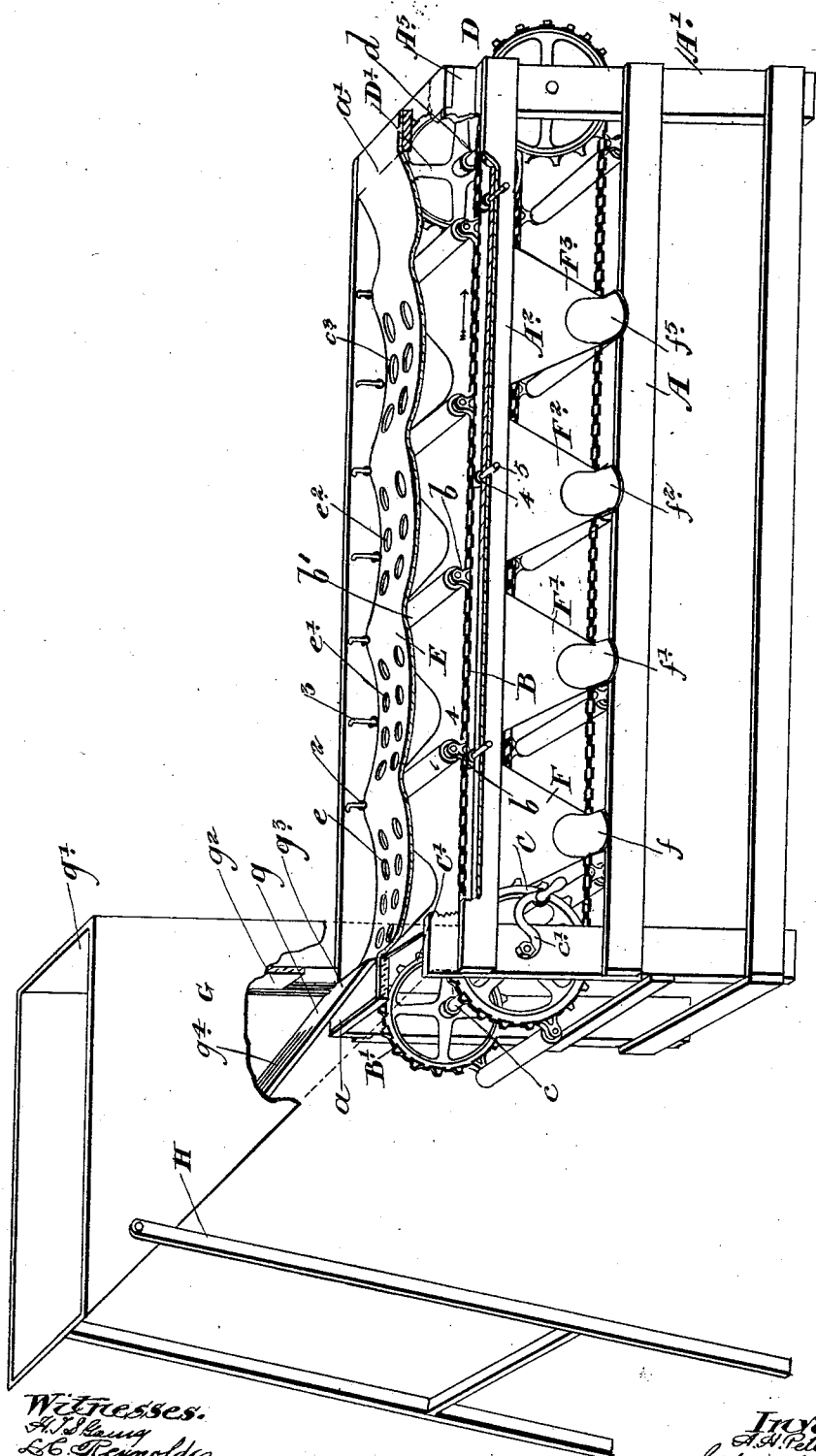

UNITED STATES PATENT OFFICE.

ANDREW HAMILTON PETTIT, OF GRIMSBY, CANADA.

FRUIT-GRADING MACHINE.

SPECIFICATION forming part of Letters Patent No. 697,360, dated April 8, 1902.

Application filed November 27, 1901. Serial No. 83,886. (No model.)

*To all whom it may concern:*

Be it known that I, ANDREW HAMILTON PETTIT, of the village of Grimsby, in the county of Lincoln, in the Province of Ontario, Canada, have invented certain new and useful Improvements in Fruit-Grading Machines, of which the following is a specification.

My invention relates to improvements in fruit-grading machines; and the object of the invention is to produce a machine of this class which will be simple in construction, positive in its action, and which will grade the fruit perfectly—that is, insure fruit of the same diameter being discharged successively into the proper bins; and it consists, essentially, of a suitable frame and endless chains supported thereby, carrying on suitable bearings attached to the chains crossrollers, a stationary apron extending over the upper portion of the chains and rollers and supported and secured on the top of the frame, such apron being provided with sections of holes graduated in size from the feed end to the discharge end, and a suitable feeding-hopper being provided, and the parts being otherwise arranged and constructed and operated as hereinafter more particularly explained.

The drawing represents a perspective view of a machine constructed in accordance with my invention, a portion of the side of the machine being in section and the stationary apron being also partially in section to exhibit the operation and arrangement.

A is the main frame of the machine, of which A' represents the uprights. $A^2$ represents the side bars. $A^3$ represents the side guards, which extend up above the level of the top of the frame.

B B' are endless chains which extend at the ends over the sprocket-wheels C C' and D D'. The sprocket-wheels C C' are secured to the shaft $c$, and the sprocket-wheels D D' are secured to the shaft $d$. The shaft $c$ is provided with a crank-handle $c'$ at the outer end, whereby the sprocket-wheels may be turned and the chains driven in the direction indicated by arrow.

E is a flexible apron extending from end to end of the frame and secured on the end crossbars $a\ a'$. The apron E is preferably made of any suitable flexible material, such as canvas, rubber, or leather. The apron E is provided with a series of sections of holes starting with the section of small holes $e$ at the feeding end and sections of holes $e'$, $e^2$, and $e^3$, which increase in size from the feed end to the discharge end. The apron is supported intermediate of its length on both sides by the rings 2, which are suitably connected to the apron and depend from the staple 3.

$b$ represents bearings attached to or forming part of the links of the endless chains and located directly opposite to each other, one on each chain. The bearings $b$ form a support for the rollers $b'$, the spindles of which are suitably journaled in the bearings.

F, F', $F^2$, and $F^3$ are bins which extend underneath the sections of holes $e$, $e'$, $e^2$, and $e^3$, respectively, in the apron and are provided with discharge-spouts $f$, $f'$, $f^2$, and $f^3$.

G is the feed-hopper, which is provided with an inclined side $g$ and a vertical side $g'$, provided with an adjustable slide $g^2$ to regulate the feed. The side $g$ is provided with a bottom board $g^3$ and a slatted portion $g^4$, upon which the fruit is fed and through which the dirt passes. The hopper G is supported by the cross-bar on the feed end of the machine and by the supports H, suitably connected thereto.

The bins F, F', $F^2$, and $F^3$ are preferably padded to prevent injury to the fruit.

The endless chains are supported in a substantially horizontal position at the top by rollers 4, extending underneath the same and journaled on spindles 5, extending into the side bars of the machine.

Having now described the principal parts involved in my invention, I shall briefly describe its operation and utility. As hereinbefore stated, the fruit is fed in through the feed-hopper G and passes onto the stationary flexible apron E. This apron is given a wavy motion by the passage of the rollers underneath it as they are carried along by the chains. The smaller fruit passes through the first sections of holes $e$, and the fruit as it increases in size passes through the sections of openings $e'$, $e^2$, and $e^3$, respectively, being carried to such openings in the following manner: The endless chains are suitably driven from the crank-handle $c$, and the cross-rollers connected to the chains pass respectively and successively underneath the sections of openings $e$, $e'$, $e^2$, and $e^3$. As the rollers by frictional contact with the apron are caused to rotate in the direction indicated by arrow, or in the opposite direction to that in which the chains pass, they serve to lift or elevate the fruit, so that the fruit which is small passes through the openings into the belt, and the fruit which is not small and does not pass through is thereby carried forward into the next succeeding section of openings, where a like operation takes place until the end of the stationary apron is reached, the larger fruit being carried over the end of the apron into a suitable box or bin. It will of course be understood that as the rollers rotate they are carried forward in the direction indicated by arrow by the chains, thus effecting the end desired and described above. By the means thus shown and described I am enabled to effectively separate the fruit very perfectly, so that the different grades are perfectly separated. The different grades will of course drop into the various bins F, F', F$^2$, and F$^3$ and be carried by the spouts $f$, $f'$, $f^2$, and $f^3$ into receptacles made to receive them.

In the drawings I have shown four sections of holes in the apron E and a corresponding bin located beneath them; but it will be understood that the number of sections of openings and the corresponding number of bins may be altered, and this would be necessarily so where the machine is driven by power, and in which case possibly it would be better to make the sections of openings longer in extent and fewer in number.

What I claim as my invention is—

1. A fruit-grading machine comprising a horizontal apron suitably supported and having a series of openings of graded size, cross-rollers beneath said apron, and means whereby said cross-rollers frictionally rotated by the apron are caused to travel continuously and successively the full length of the apron and in contact with the under surface thereof and with the fruit in the openings, substantially as described.

2. A fruit-grading machine comprising a stationary apron held in a suitable frame and having a series of sections of openings of graded size and a series of rollers suitably supported and frictionally contacting with the belt whereby they are rotated in opposite directions to that in which they are carried longitudinally as and for the purpose specified.

3. The combination with the stationary apron suitably held at the end on the frame of the machine and provided with a series of sections of openings of graded size extending crosswise of the apron, of the endless chains provided with suitable bearings and rollers journaled in such bearings and designed to come in frictional contact with the apron, so as to cause them to rotate in the opposite direction to that in which the rollers are carried longitudinally as and for the purpose specified.

4. The combination with the stationary apron suitably held at the end on the frame of the machine and provided with a series of sections of openings of graded size extending crosswise of the apron, of the endless chains provided with suitable bearings and rollers journaled in such bearings and designed to come in frictional contact with the apron, so as to cause them to rotate in the opposite direction to that in which the rollers are carried longitudinally and rollers for supporting the upper portion of the chain immediately underneath the apron as and for the purpose specified.

5. The combination with the stationary apron suitably held at the end on the frame of the machine and provided with a series of sections of openings of graded size extending crosswise of the apron, of the endless chains provided with suitable bearings and rollers journaled in such bearings and designed to come in frictional contact with the apron, so as to cause them to rotate in the opposite direction to that in which the rollers are carried longitudinally and a feed-hopper provided with an adjustable slide immediately above the feed end of the apron and a slatted feed-board whereby the surplus dirt is removed as and for the purpose specified.

6. The combination with the stationary apron suitably held at the end on the frame of the machine and provided with a series of sections of openings of graded size extending crosswise of the apron, of the endless chains provided with suitable bearings and rollers journaled in such bearings and designed to come in frictional contact with the apron, so as to cause them to rotate in the opposite direction to that in which the rollers are carried longitudinally and the bins or hoppers extending underneath each section of openings comprising the different grades, such bins being suitably padded as and for the purpose specified.

ANDREW HAMILTON PETTIT.

Witnesses:
J. A. PETTIT,
GERARD PALMER.